United States Patent

Leach

[15] 3,688,608
[45] Sept. 5, 1972

[54] TRANSMISSION CONTROL MECHANISM

[72] Inventor: Michael E. H. Leach, Hinxworth, England

[73] Assignee: Borg-Warner Limited, Letchworth, England

[22] Filed: April 24, 1970

[21] Appl. No.: 31,546

[30] Foreign Application Priority Data

April 25, 1969 Great Britain..........21,353/69

[52] U.S. Cl......................................74/869, 74/753
[51] Int. Cl...........................B60k 21/00, F16h 3/44
[58] Field of Search...............................74/864, 869

[56] References Cited

UNITED STATES PATENTS

| | | | |
|---|---|---|---|
| 3,583,259 | 6/1971 | Shimosaki | 74/864 |
| 2,926,543 | 3/1960 | Holdeman et al. | 74/869 |
| 3,146,630 | 9/1964 | Ivey | 74/869 |
| 3,494,223 | 2/1970 | Mori | 74/869 X |

Primary Examiner—Arthur T. McKeon
Attorney—Robert L. Zieg

[57] ABSTRACT

A hydraulic control system for an automatic transmission providing four forward drive ratios by selective engagement of friction-engaging devices and including a shift valve for each of the shifts between drive ratios, valve means producing a first pressure responsive to vehicle speed and valve means producing a second pressure responsive to engine load and throttle position, said pressures each influencing said shift valves to determine the shift points of the transmission, and further including an exhaust valve means for each of two friction elements, said exhaust valve means being responsive to said pressures to control exhaust of pressure from said friction elements when the transmission is upshifted. The control system further includes timing valve means responsive to said first pressure to control the rate of engagement of said friction devices when the transmission is downshifting between ratios and accumulator means responsive to each of said pressures to further control the rate of engagement of said friction devices.

23 Claims, 9 Drawing Figures

TRANSMISSION CONTROL MECHANISM

The present invention relates to a hydraulic control system for an automatic transmission for a vehicle.

According to one aspect of the present invention there is provided such a system including a source of fluid pressure and a plurality of fluid pressure-operated engaging devices for establishing various drive ratios through the transmission, a plurality of shift valves movable to establish a connection between said source and said engaging devices to establish the drive ratios, an exhaust valve connected to one of said engaging devices, said exhaust valve including means movable between a first position providing a substantially unrestricted flow path to exhaust pressure from said engaging device and a second position blocking said flow path, urging means urging said movable means toward said first position, means adapted to develop a modulating pressure responsive to engine torque demand, said modulating pressure being connected to said exhaust valve to produce a force on said movable means tending to retain said movable means in said second position, means connected to said one engaging device being adaptable to provide a restricted exhaust flow path for said one engaging device when said movable means is in said second position, said urging means for said exhaust valve including a connection to engaging pressure for an additional engaging device, said engaging pressure being operative to urge said movable means to its first position when said engaging pressure reaches a predetermined value whereby when said drive ratio is changed by engaging said additional engaging device and disengaging said one engaging device, disengagement of said one engaging device will be retarded for a time dependent upon said modulating pressure and the value of said engaging pressure to provide for smooth ratio changing.

If desired the modulation pressure may also be responsive to vehicle speed.

According to a further aspect, the invention provides a hydraulic control system for an automatic transmission including a source of fluid pressure and a manual selector valve having a plurality of ports for distributing pressure from said source of said control system, said manual valve having a first port for receiving pressure from said source and a second port connected to said control system, said manual valve including a spool having slots for providing desired connections between said ports of said valve, said manual valve having a plurality of forward positions including an automatic ratio changing position and additional selective positions in which said manual valve is adapted to select particular drive ratios in the transmission, said manual valve providing a fluid connection between said first and second ports in the forward positions of said manual valve, a third port on said manual valve in fluid communication with said second port whereby when said second port is pressurized said third port is also pressurized, said second and third ports being on opposite sides of said first port, and said third port acting as a pressure signal port to condition said control system to establish said particular drive ratios for all said additional selective positions of said manual valve.

Preferably the first, second and third ports are arranged on the same side of said valve.

The invention also relates to a hydraulic control system for an automatic transmission having a shift valve having at least two positions and being adapted to change the ratio of the transmission as said valve is moved between said positions, a source of fluid pressure, governor means connected to said source and to said shift valve, said governor means adapted to produce a governor pressure responsive to vehicle speed and having a first connection with said shift valve, said governor pressure increasing with vehicle speed and adapted to urge said shift valve to one of its positions to change the ratio through the transmission, a second connection between said governor pressure and said shift valve, said shift valve having lands thereon of differential area, said lands being exposed to governor pressure through said second connection and urging said valve in an opposite direction to said governor pressure in said first connection whereby the total effective force of said governor pressure on said shift valve is reduced and optional means in said second connection whereby said connection can be completed or interrupted so that the response of said shift valve to governor pressure may be varied depending upon whether said second connection is completed or interrupted.

A still further aspect of this invention provides a hydraulic control system for an automatic transmission including a plurality of engaging devices each actuable to establish a particular drive ratio, at least two shift valves each having an upshifted and a downshifted position and in each position adapted to condition the transmission for a particular drive ratio by making fluid connections to engage one of said engaging devices and exhaust another of said engaging devices, a pair of exhaust valves one for each of said shift valves and adapted to vary the rate at which fluid pressure is exhausted from said another engaging device as said shift valve moves to its upshifted position, a pair of timing valves one for each of said shift valves adapted to vary the rate of supply of pressure to said one engaging device when said shift valve moves to its downshifted position, whereby each change of ratio made by said shift valves as they move to their downshifted positions is controlled by a separate timing valve and each change of ratio made by said shift valves as they move to their upshifted positions is controlled by an exhaust valve so that the ratio changes made in either the upshifting or downshifting direction by each shift valve can be controlled by changing the structure of a single timing or exhaust valve without affecting the character of the other ratio changes made in the transmission.

In order that the invention may more readily be understood, the following description is given, merely by way of example, reference being made to the accompanying drawings, in which.

Figure 1:
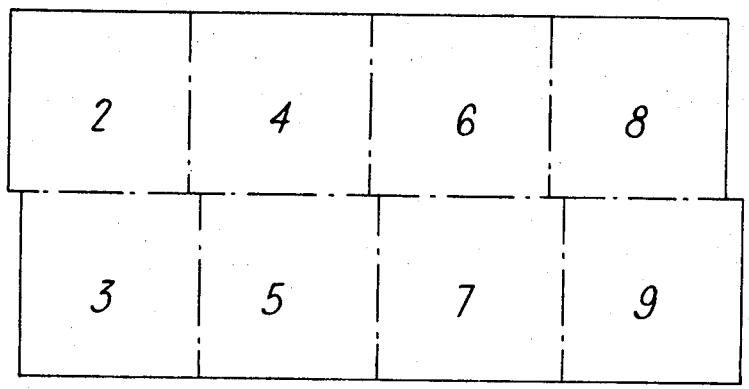
FIG. 1 is a reference layout diagram for combining FIGS. 2 to 9.
Figure 2:
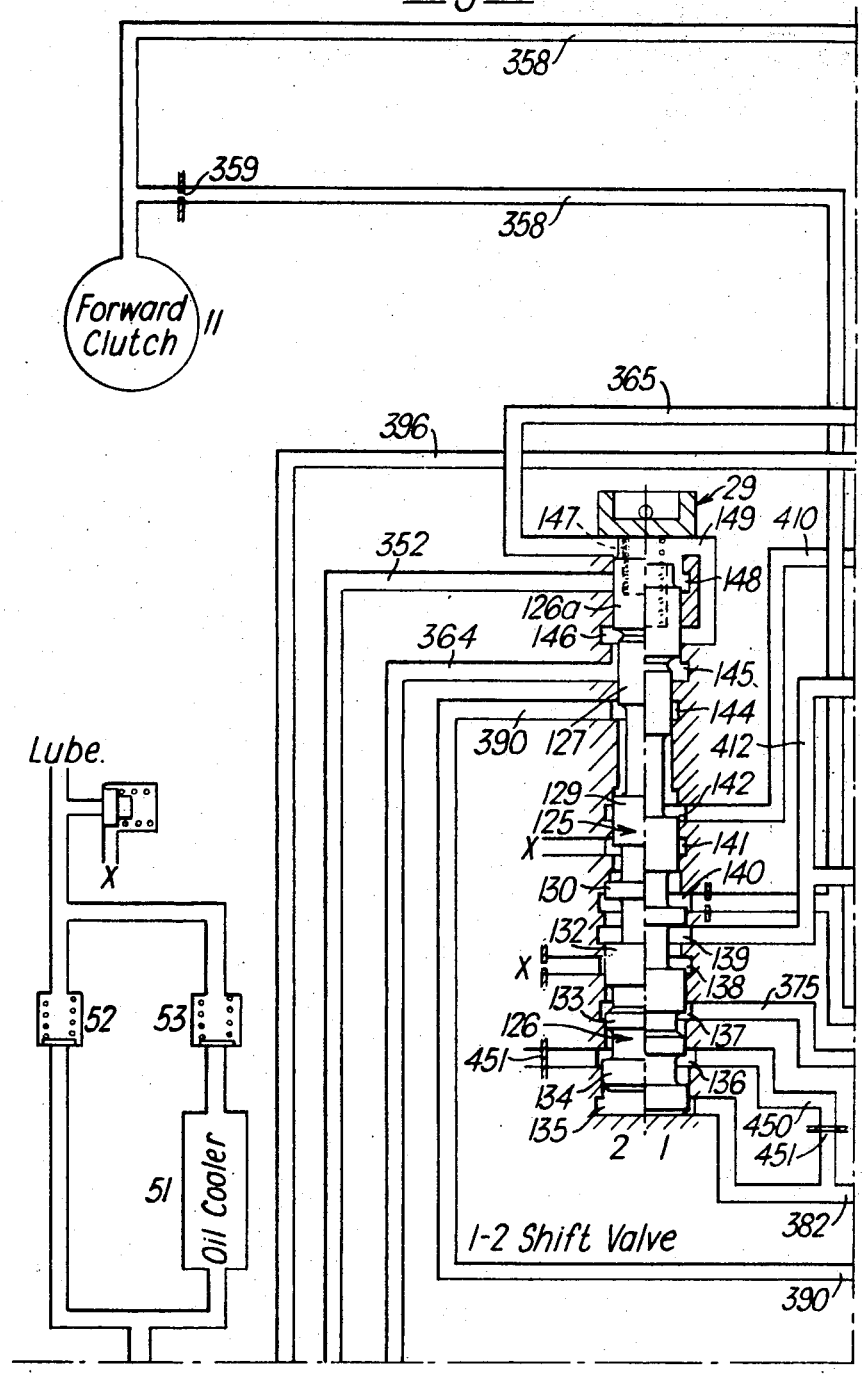
FIGS. 2 to 9 show in detail one embodiment of hydraulic control system according to the invention.
Figure 3:
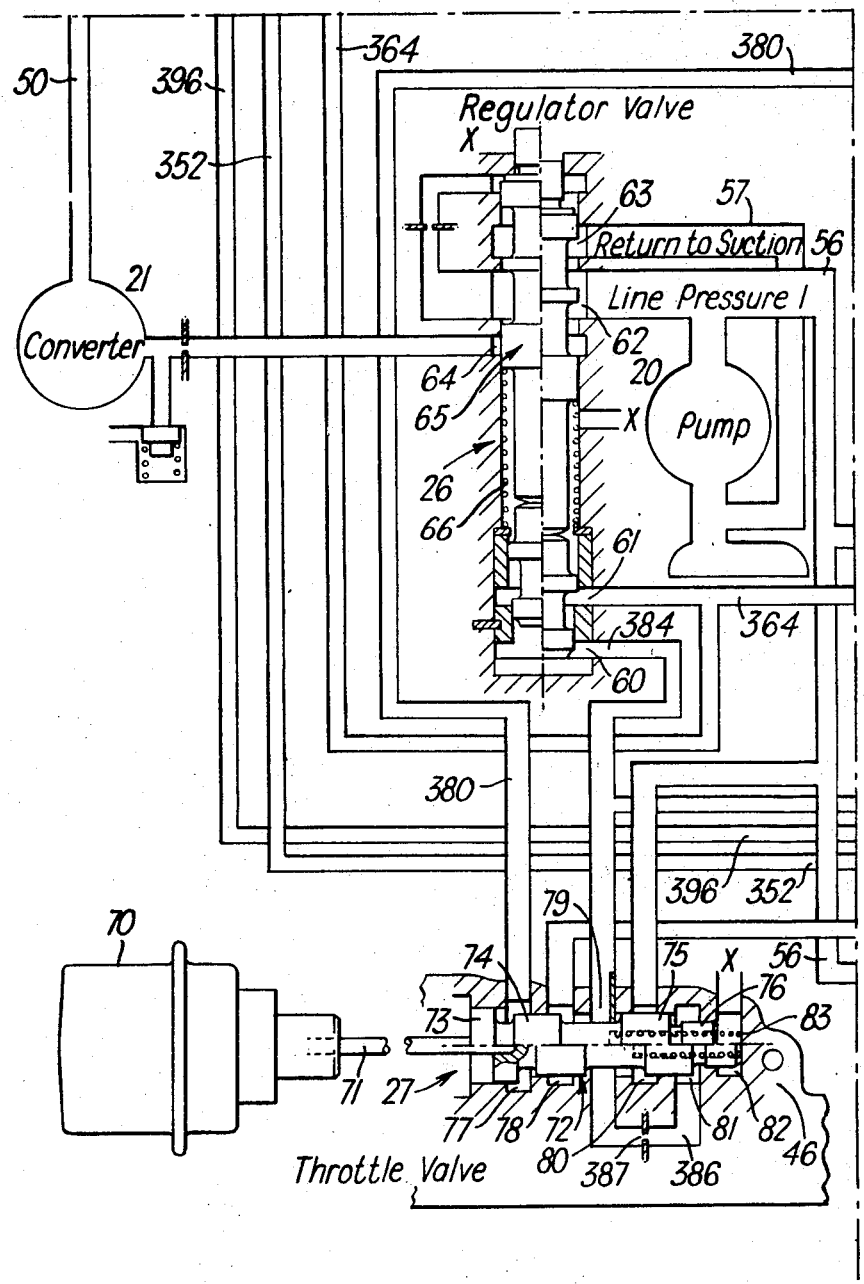
Figure 4:
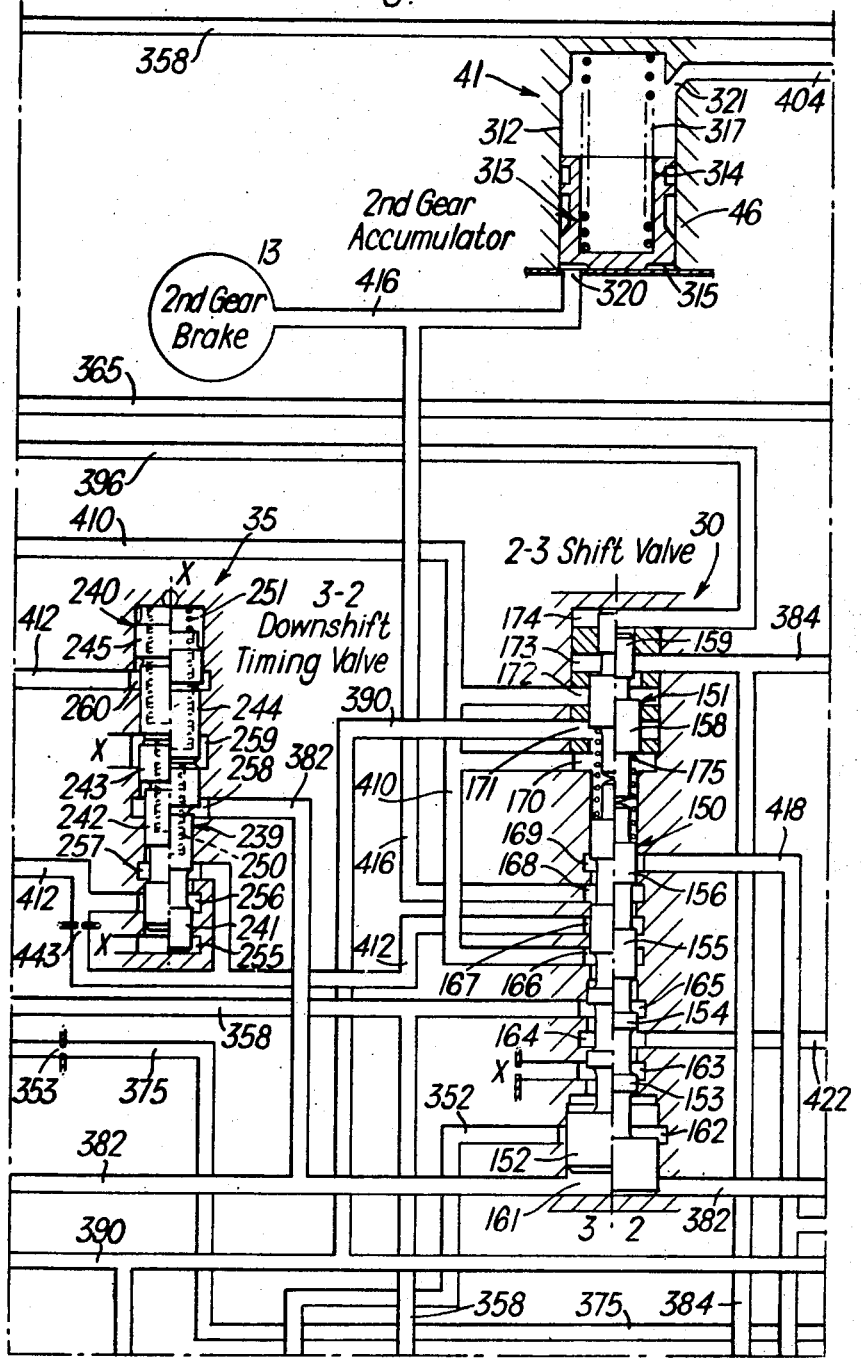
Figure 5:
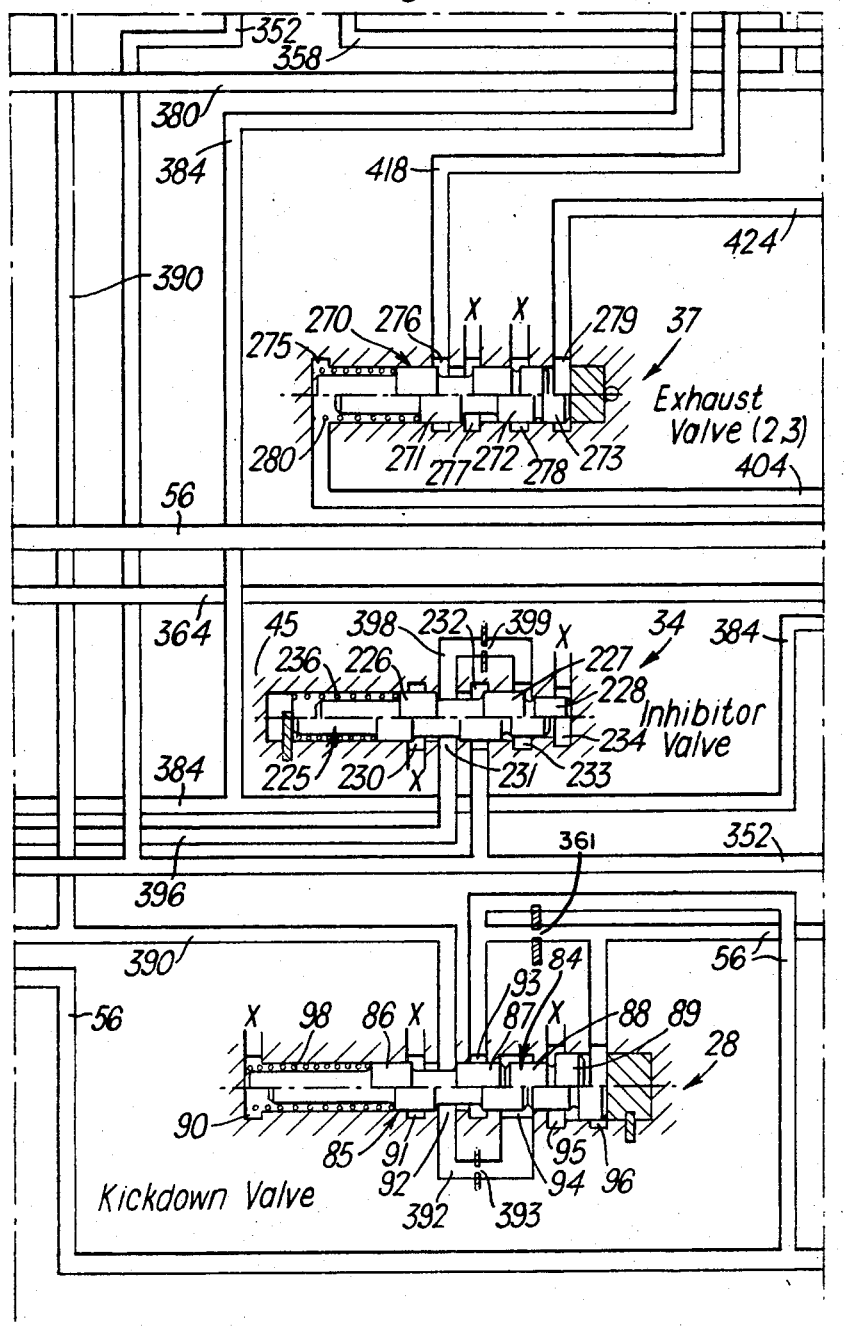
Figure 6:
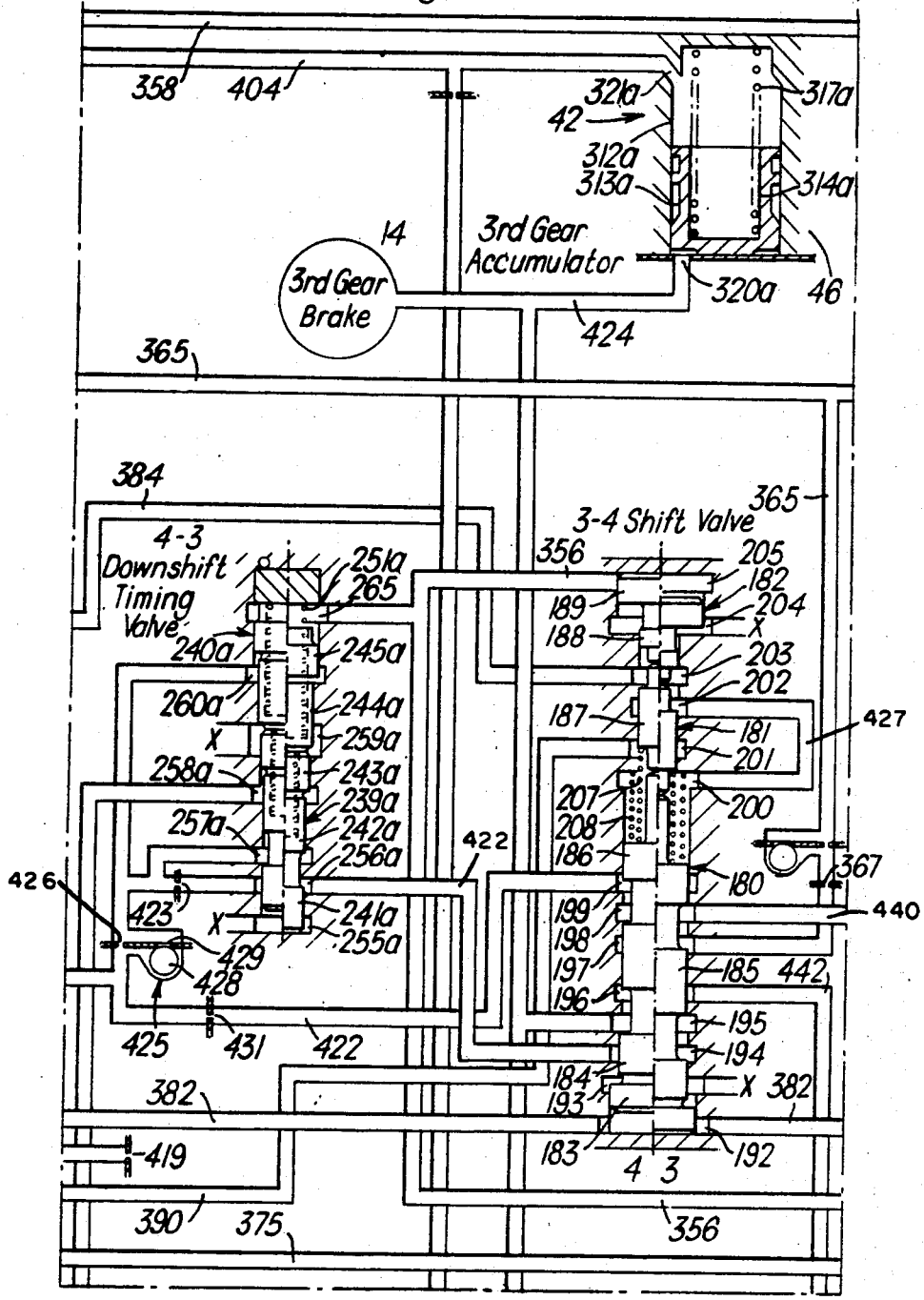
Figure 7:
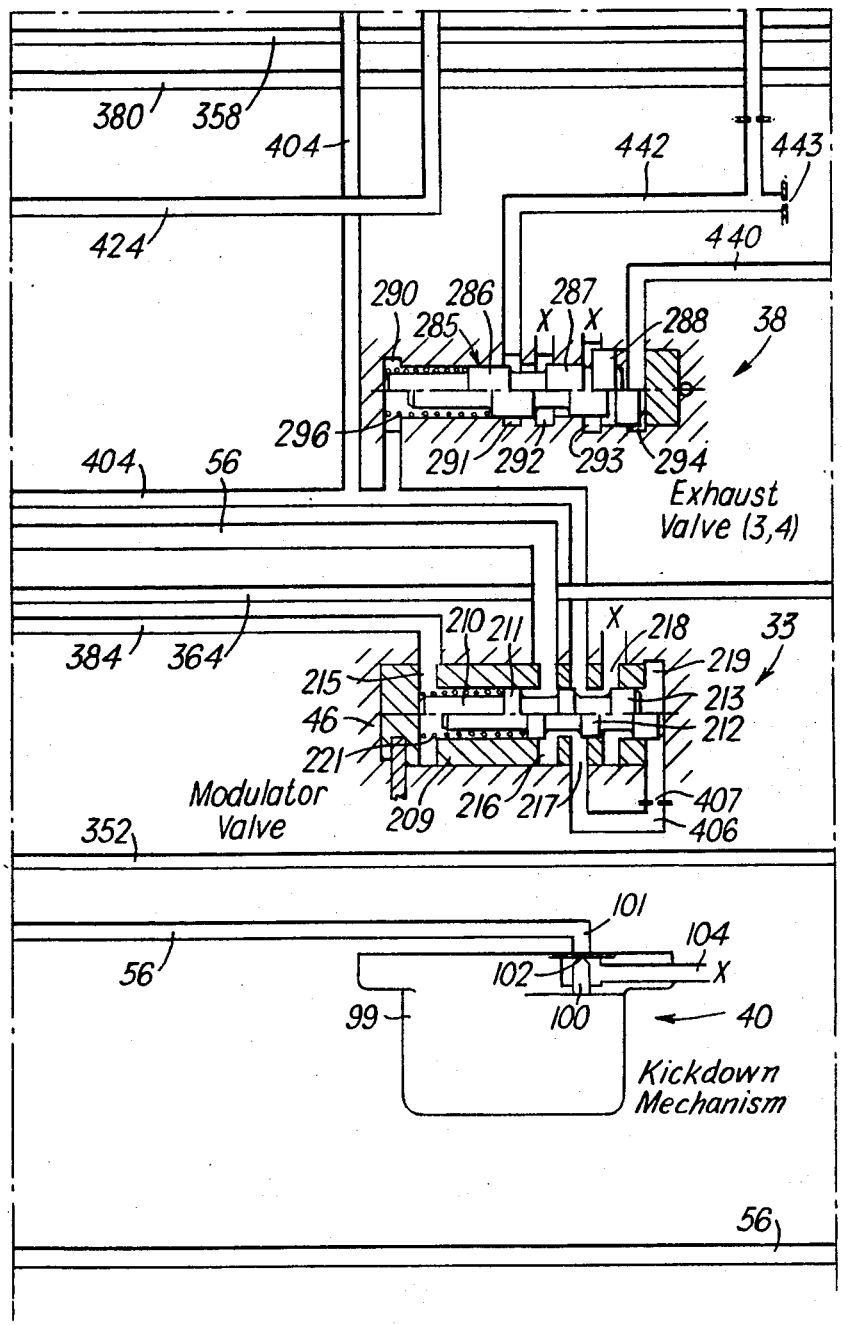
Figure 8:
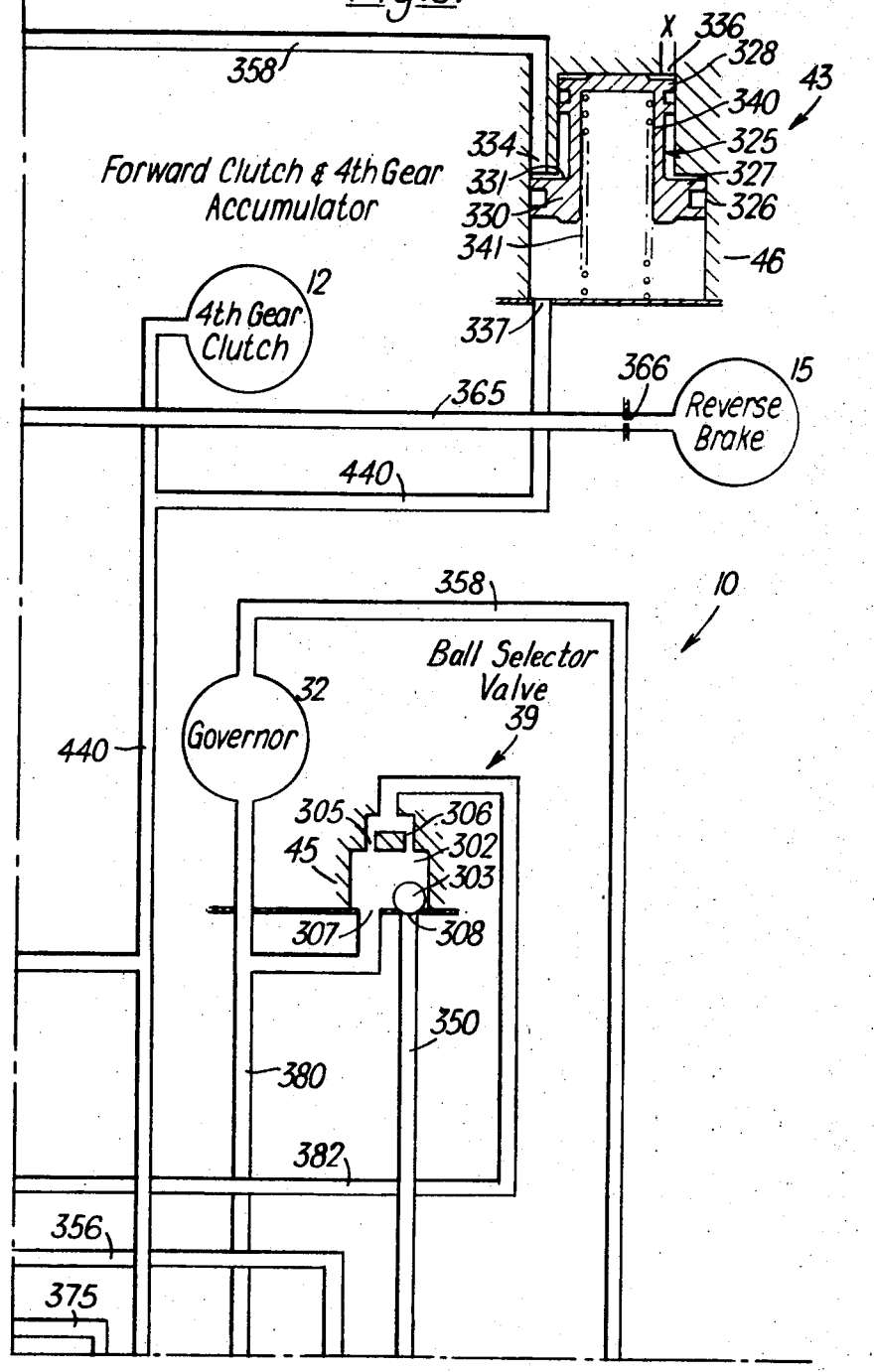
Figure 9:
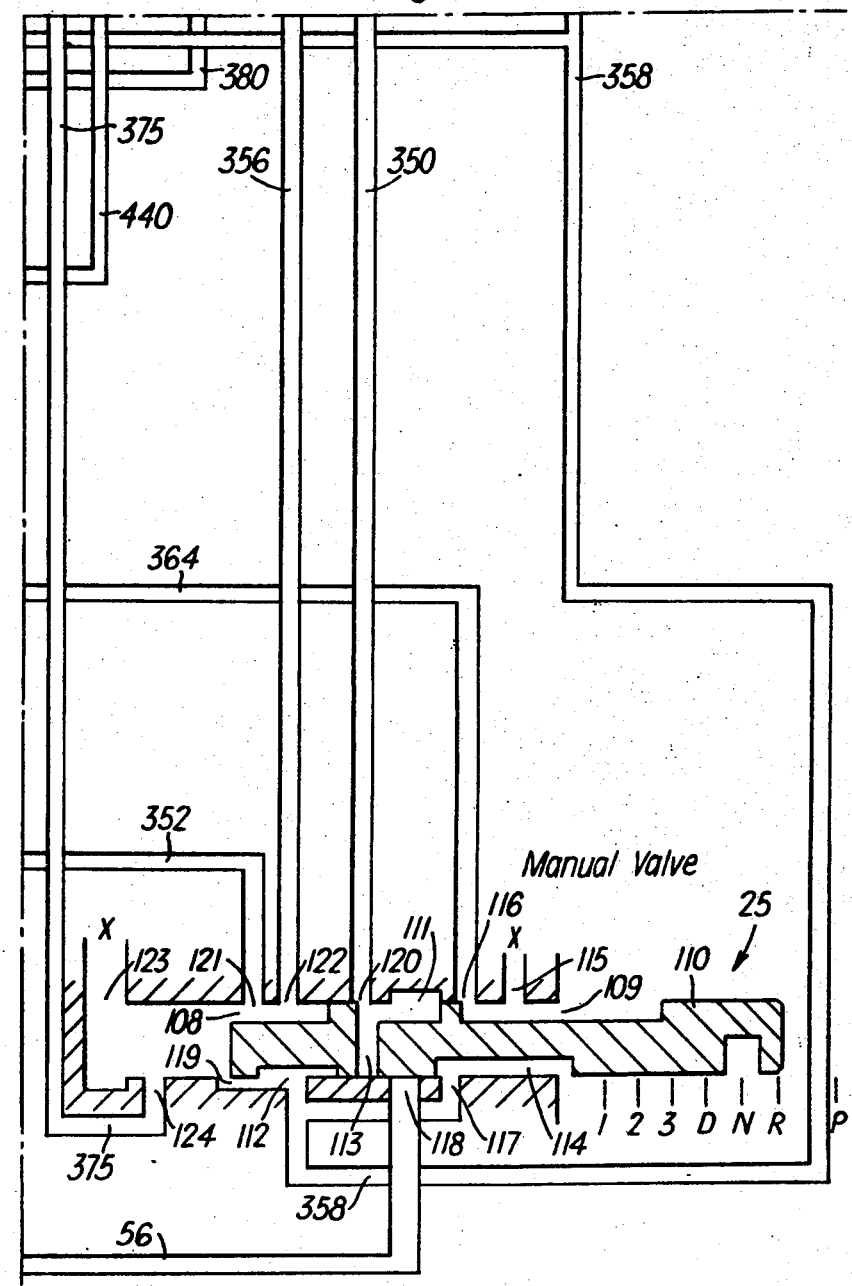

Referring to the drawings, an improved control mechanism for an automatic transmission is illustrated. The control mechanism is illustrated as controlling friction elements which are shown in block form in the drawings. The control mechanism 10 is made to operate a transmission which may, for example, include a forward clutch 11 and a second clutch 12, a second gear brake 13, a third gear brake 14, and a reverse brake 15. The control system is adapted to control any gear mechanism having this number of friction elements and, for example, is adapted to control the transmission mechanism disclosed in pending application Ser. No. 683,414 filed Nov. 15, 1967 in which the various ratios are obtained by engagement of the friction clutch and brake elements in accord with the following table where X indicates a clutch or brake engaged:

| Ratio | Clutch 11 | Brake 13 | Brake 14 | Clutch 12 | Brake 15 or one-way Brake |
|---|---|---|---|---|---|
| Neutral | | | | | |
| First | X | | | | X |
| Second | X | X | | | |
| Third | X | | X | | |
| Fourth | X | | | X | |
| Reverse | | | | X | X |

The transmission control mechanism 10 includes a pump 20 driven by the engine of the vehicle. Also illustrated schematically is a torque converter 21 which would be of the common three element type, for example. The transmission further includes the following valves and control elements: a manual valve 25, a regulator valve 26, a throttle valve 27, kickdown valve 28, 1–2 shift valve 29, 2–3 shift valve 30, a 3–4 shift valve 31, governor valve 32, modulator valve 33, 3–2 inhibitor valve 34, 3–2 downshift timing valve 35, 4–3 downshift timing valve 36, exhaust valve 37, exhaust valve 38, ball selector valve 39, kickdown mechanism 40, second gear accumulator mechanism 41, third gear accumulator mechanism 42 and a forward clutch and fourth gear accumulator mechanism 43.

The valves above-described are hereinafter referred to in abbreviated form in accordance with the following table:

| | |
|---|---|
| MV | manual valve |
| RV | regulator valve |
| TV | throttle valve |
| KDV | kickdown valve |
| 1–2 | 1–2 shift valve |
| 2–3 | 2–3 shift valve |
| 3–4 | 3–4 shift valve |
| GV | governor valve |
| MDV | modulator valve |
| 3–2 IV | inhibitor valve |
| 3–2 DTV | 3–2 downshift timing valve |
| 4–3 DTV | 4–3 downshift timing valve |
| EV | exhaust valve |
| BSV | ball selector valve |
| KM | kickdown mechanism |

The valve spools for the above valves are illustrated in the drawings in a split form. The valve spools are split along their longitudinal axis for clarity such that both extreme positions of the valve spool is illustrated by showing the split sections in different positions. Further it should be explained that various sections of a common valve body 45 is illustrated for all valve except TV valve 27. However, it is apparent that various individual valves or groups thereof can be mounted in separate valve bodies if the illustrated fluid connections are made. In a preferred embodiment of the invention the TV valve 27 and accumulators 41, 42 and 43 are mounted in portions of the main transmission case portions of which are indicated by numeral 46.

The fluid torque converter 21 has a discharge passage 50 connected to an oil cooler 51 and a bypass check valve 52. Connected to the oil cooler outlet is a second check valve 53. Both check valves 52 and 53 are connected by a conduit 54 to a lubrication line for the transmission. As is known in previous transmissions, the oil cooler serves to cool the oil of the transmission before supplying it to the lubrication line. However, in case the flow is too great for the oil cooler to accept, oil can flow through the bypass check valve 52 to the lubrication line to prevent a lack of lubricating oil in the transmission.

Pump 20 is the main transmission pump which may be of a known gear type connected to be driven by an input element to the transmission 50 as to be driven by the vehicle engine. Pump 20 is connected by an outlet conduit 56 to the regulator valve 26 and a return conduit 57 connects the regulator valve 26 to the inlet of the pump. The outlet conduit 56 of the pump is the line pressure conduit for the transmission carrying fluid pressure of a value as regulated by the regulator valve 26.

The RV 26 is not illustrated in detail but comprises a valve having ports 60, 61, 62, 63 and 64. The RV has a valve spool 65 adapted to be acted upon by fluid pressure and includes a spring 66 working on the valve element such that the pressure supplied by the pump at port 62 will be regulated depending upon the influence of controlling pressures on the RV 26. Port 64 is connected to supply pressure to the torque converter 21.

The TV 27 is connected to be influenced by a vacuum can 70, the vacuum can 70 being of a known type structure and therefore not described in detail. The can 70 has a rod element 71 adapted to contact and move the valve spool 72 of the TV. The TV spool 72 is mounted in a bore in a valve body 45 and has lands 73, 74, 75 and 76. The valve body 45 further includes ports 77, 78, 79, 80, 81 and 82 communicating with the bore for TV 27. A spring 83 is provided entering a bore in the valve spool 72 and is adapted to urge the valve spool 72 to the left as viewed in the drawing.

The KDV 28 includes a valve spool 84 and a valve spool 85 mounted in a bore in valve body 45. Valve spool 85 has lands 86 and 87 thereon. Valve spool 84 has lands 88 and 89 thereon. The valve body 45 includes ports 90, 91, 92, 93, 94, 95 and 96 communicating with the bore for KDV 28. A spring 98 is adapted to contact the valve spool 85 and move it to the right as viewed in the drawing.

The KM 40 has a valve element 100 movable by a solenoid 99. A port 101 is provided in valve body 45 forming a valve seat 102 adapted to be contacted by valve element 100 and further including a port 104.

The MV 25 includes a valve spool 110 which is adapted to be connected to the manual selector lever of the transmission which would, for example, be located on the steering column of the vehicle. The valve spool 110 has positions corresponding to the 1–2–3–D–N–R–P positions of the manual selector lever. The valve spool 110 is of the type being non-symmetrical and having axial slots therein on top and bottom thereof to make the various fluid connections, such that in operation it is reciprocated in its bore but is not allowed to rotate. The valve spool 110 has slots 108, 109 and 111 formed in the upper side thereof and slots 112 and 114 formed in the lower side thereof. A slot 113 is provided extending through spool 110 communicating with slot 111 and opening on the lower side of the spool. Provided in the bore of the valve body 45 for MV 25 are ports 115, 116, 117, 118, 119, 120, 121, 122, 123 and 124.

The 1–2 SV 29 includes valve spool 125 and 126 and a plug 126a provided in a bore in the valve body 45. The valve spool 125 has lands 127, 129, 130 and 132 thereon. The valve spool 126 had lands 133 and 134 thereon. Provided in the valve body communicating with a bore for the valve spool 125 are ports 135, 136, 137, 138, 139, 140, 141, 142, 144, 145, 146, 148 and 149. A spring 147 is provided in the bore contacting the end of the valve spool 125 and urging the valve spool downwardly as viewed in the drawing.

The 2–3 SV 30 has a valve spool 150 mounted in a bore provided in the valve body 45 and a second valve spool 151 in the same bore adjoining and at times in contact with the valve spool 151 in the same bore adjoining and at times in contact with the valve spool 150. Valve spool 150 includes lands 152, 153, 154, 155 and 156. The valve spool 151 has lands 158 and 159 thereon. Provided in the valve body in communication with the bore for the valve spools 150 and 151 are fluid ports 161, 162, 163, 164, 165, 166, 167, 168, 169, 170, 171 172, 173 and 174. A spring 175 is provided between the valve spools 150 and 151 in contact with each and tending to move the valve spools apart.

The 3–4 SV 31 includes a valve spool 180, a valve spool 181 and a valve spool 182. These valve spools are all mounted in a common bore in the valve body 45 and are at times in contact with one another. The valve spool 180 has lands 183, 184, 185 and 186 thereon. The valve spool 181 has a single land 187, and valve spool 182 has lands 188 and 189 thereon. Provided in the valve body 45 and in communication with a bore for 3–4 SV 31 are ports 192, 193, 194, 195, 196, 197, 198, 199, 200, 201, 202, 203, 204 and 205. A pair of springs 207 and 208 are provided. Spring 207 is in contact with each of the valve spools 180 and 181 to urge them apart. Spring 208 contacts the valve body 45 at one end and the valve spool 180 at the other end tending to move valve spool 180 to its downward position as viewed in the drawing.

The GV 32, not illustrated in detail, may be of any of the known types of governors used in automatic transmissions which are adapted to receive pressure from a fluid supply system and provide a regulated pressure which increases with vehicle speed to act as a control influence responsive to vehicle speed.

MDV 33 comprises a valve spool 210 mounted in a bore in a sleeve 209 which is mounted in the valve body 45. The valve spool 210 has lands 211, 212 and 213 thereon communicating with the bore for MV 33. A spring 221 is provided engaging the valve body and the spool 210 urging the spool to the right as viewed in the drawing. MDV 33 is mounted in sleeve 209 so that MDV 33 can be easily changed so that the response of the valve can be varied for different torque requirements of the various engine sizes with which the transmission is used.

The 3–2 IV 34 includes a valve spool 225 mounted in a bore in the valve body 45. The valve spool 225 has lands 226, 227, 228 thereon. The bore for the 3–2 IV 34 has communicating therewith ports 230, 231, 232, 233 and 234. A spring 236 is provided engaging the valve body and the valve spool 225 and urging the valve spool 225 to the right as viewed in the drawing.

The 3–2 DTV 35 includes valve spools 239 and 240 mounted in a bore in the valve body 45. Valve spool 239 has lands 241, 242, 243 thereon and valve spool 240 has lands 244, 245 thereon. A spring 250 is provided engaging the valve spools 240 and 239 tending to move them apart. A spring 251 urges the valve spool 240 downwardly as viewed in the drawing. The bore for 3–2 DTV includes the following ports communicating therewith: 255, 256, 257, 258, 259 and 260.

The 4–3 DTV 36 is very similar in construction to the 3–2 DTV 35. Therefore the elements which are identical are numbered as are the elements on DTV 35; however, a small suffix a has been added to the numbers to indicate that they are for DTV 36. The 4–3 DTV does include an extra port 265 at the upper end thereof.

EV 37 includes a valve spool 270 slidable in a bore provided in the valve body 45. Valve spool 270 includes lands 271, 272 and 273. Provided in the valve body in communication with the bore for EV 37 are ports 275, 276, 277, 278 and 279. A spring 280 engages the valve body and the valve spool 270 urging the valve spool to the right as viewed in the drawing.

EV 38 includes a valve spool 285 mounted in a bore in the valve body 45. The valve spool 285 has lands 286, 287 and 288 thereon. Provided in the valve body in communication with the bore for EV 38 are ports 290, 291, 292, 293 and 294. Also provided is a spring 296 contacting the valve body and the valve spool 285 urging the valve spool 285 to the right as viewed in the drawing. The BSV 39 has a chamber 302 in valve body 45 with a ball 303 therein. The valve includes a pair of inlet ports 307, 308 and a pair of outlet ports 305, 306. The inlet ports 307, 308 form ball seats whereby the ball 303 will be engageable with one of the seats depending upon pressure values admitted in the inlet ports 307 and 308.

Accumulator mechanisms 41 and 42 are identical in structure, therefore only accumulator mechanism 41 is described in detail, corresponding elements of accumulator mechanism 42 carrying the same reference numerals with the addition of suffix a. Accumulator mechanism 41 includes a bore 312 provided in case 46 having a piston 313 slidable therein. The piston 313 is cup shaped having an internal bore 314. The piston has a pressure-responsive face 315 on the lower end thereof as viewed in the drawing. A spring 317 in the bore 314 of piston 313 urges the piston of the accumulator downwardly. The accumulator includes ports 320, 321.

The forward clutch and 4th gear accumulator 43 includes a piston 325 mounted in a stepped bore 326 in the valve body 45. The piston 325 includes lands 327, 328. The land 327 has pressure responsive surfaces 330 and 331 thereon. The accumulator includes ports 334, 336, and 337. The piston 325 has a bore 340 therein receiving a spring 341 which is adapted to urge the piston 325 in an upward direction as viewed in the drawing.

The various valves of the transmission control system are connected by a conduit structure in accordance with the following description.

As described above, line pressure conduit 56 is connected to RV 26 at port 62, to TV 27 at port 80, to KDV 28 at ports 93 and 96, to KM 40 at port 101, to MV 25 at port 118, to MOD V 33 at port 216. A conduit 350 interconnects port 120 of MV 25 with port 308 of BSV 39. A conduit 352 interconnects port 121 of MV 25 with port 232 of IV 34, port 162 of 2–3 SV 30 and port 148 of 1–2 SV 29. A conduit 356 interconnects ports 122 of MV 25 with port 265 of DTV 36 and port 205 of 3–4 SV 31. A conduit 358 interconnects ports 117 and 119 of MV 25 with port 165 of 2–3 SV 30, port 140 of 1–2 SV 29, forward clutch 11, GV 32 and port 334 of accumulator 43. An orifice 359 is provided in conduit 358 in the section between MV 25 and forward clutch 11. An orifice 361 is provided in conduit 56 in the area between ports 96 and 93 of KDV 28. A conduit 364 interconnects port 116 of MV 25 with port 61 of RV 26, and port 145 of 1–2 SV 29. A conduit 365 connects port 149 of 1—2 SV 29 with reverse brake 15 and port 197 of 3–4 SV 31. An orifice 366 is provided in conduit 365 between the verse brake 15 and 1–2 SV 29. An orifice 367 is provided in conduit 365 in the area near port 196 of 3–4 SV 31. A conduit 375 connects port 124 of MV 25 with port 137 of 1–2 SV 29. An orifice 353 is provided in conduit 375. Conduit 380 interconnects the GV 32 with port 307 of BSV 39, port of 258a of DTV 36, and port 77 of TV 27. A conduit 382 interconnects outlet ports 305 and 306 of BSV 39 to port 192 of 3–4 SV 31, port 161 of 2–3 SV 30, port 258 of DTV 35 and port 135 of 1–2 SV 29.

A conduit 384 interconnects port 79 of TV 27, port 60 of RV 26, port 215 of MDV 33, port 173 of 2—3 SV 30, and port 203 of 3—4 SV 31. A conduit 386 interconnects port 79 and port 81 of TV 27. The conduit 386 has an orifice 387 therein. A conduit 390 interconnects port 92 of KDV 28 with port 78 of TV 27, port 144 of 1—2 SV 29, port 171 of 2—3 SV 30 and port 201 of 3—4 SV 31. A conduit 392 interconnects ports 92 and 94 of KDV 28. An orifice 393 is provided in the conduit 392. A conduit 396 interconnects port 231 of 3—2 IV 34 with port 174 of 2—3 SV 30. A conduit 398 interconnects ports 231 and 233 of 3—2 IV 34. Conduit 398 has an orifice 399 therein.

A conduit 404 interconnects port 217 of MDV 33 with port 290 of EV 38, port 275 of EV 37, and ports 321 and 321a of accumulators 41 and 42 respectively. A conduit 406 interconnects ports 217 and 219 of MDV 33. An orifice 407 is provided in the conduit 406. A conduit 410 interconnects port 142 of 1–2 SV 29 with ports 172, 170 and 166 of 2–3 SV 30. A conduit 412 interconnects port 139 of 1–2 SV 29 with ports 260, 256, 257 of DTV 35 and with port 167 of 2–3 SV 30. An orifice 443 is provided in conduit 412 in the area between ports 256 and 257 of DTV 35. A conduit 416 interconnects port 168 of 2–3 SV 30 with port 320 of accumulator 41 and the second gear brake 13. A conduit 418 interconnects port 169 of 2–3 SV 30 with a port 276 of ERV 37. An orifice 419 is provided in conduit 418 which opens to sump. A conduit 422 interconnects port 164 of 2-3 SV 30 with ports 260a 256a and 257a of 4—3 DTV 36, port 199 of 3–4 SV 31, port 194 of 3–4 SV 31. A conduit 424 connects port 195 of 3-4 SV 31 with port 279 of EV 37, port 320a of accumulator 42, and the third gear brake 14. An orifice 423 is provided in the conduit 422 in the area between ports 256a and 257a of 4-3 DTV 36. Also provided in the conduit 422 is a bypass check valve 425 which has a small orifice 426 therein permitting flow of fluid between port 164 of 2-3 SV 30 and ports 260a, 256a and 257a through the orifice 426 of flow in a direction toward the DTV 36. The valve 425 includes a ball 428 engaging a port 429 whereby with fluid flowing in the direction from the 4–3 DTV 36 toward port 164 of 2-3 SV 30 and the other port connections of the conduit 422 will move the ball 428 from engagement with the port 429 and provide a bypass around orifice 426 to permit greater flow in this direction than in the opposite. An additional orifice 431 is provided in the conduit 422 between the 2-3 SV 30, DTV 36 and the 3–4 SV 31. A conduit 440 interconnects port 198 of 3-4 SV 31, port 294 of EV 38, port 337 of accumulator 43 and the second clutch 12. A conduit 442 interconnects port 196 of 3-4 SV 31 with port 291 of EV 38. Provided in the conduit 442 is an orifice 443 connecting conduit 442 to sump.

A branch conduit 450 is provided for conduit 382 connecting to port 136 of 1-2 SV 29. It should be noted that in valve bodies for automatic transmissions a separator plate is used which can be conveniently provided with holes at proper locations to make the desired fluid connections between the several valves. Portions of such a plate 451 are shown in the drawing as related to conduit 450. Conduit 450 can optionally be opened by providing a hole 452 in plate 451 in the area between conduit 382 and port 136. As illustrated in the drawing port 136 on the opposite side of 1-2 SV 29 is blocked by the plate 451, however this area of port 136 may be optionally connected to exhaust by a hole in plate 451 as would b the case if branch conduit 450 is not used (blocked by plate 451). The purpose of the optional structure enabling part 136 to be connected to governor pressure conduit 382 is explained in the following description of operation of the control system.

Each of the valves of the present control system has many ports which are exhaust ports in that they are ports that connect with the sump for the transmission. Each of the ports shown on the drawing which are exhaust ports have a small *x* therein which is commonly used to indicate an exhaust or return to sump and specific reference to each port that is an exhaust port will not be made.

The transmission control system 10 utilizes several pressure signals to carry out the various automatic shifting and pressure regulating functions. These are namely, governor pressure, throttle modulator pressure and an accumulator pressure.

Governor valve 32 receives fluid pressure from conduit 358 and produces a regulated lower fluid pressure in conduit 380 which increases with vehicle speed since the governor mechanism is driven by the output shaft of the transmission. Thus the pressure in conduit 380 is referred to as "governor pressure" hereinafter and is a pressure which increases with increasing vehicle speed. The governor pressure is also admitted through BSV 39 into conduit 382 if there is no pressure in conduit 350 as will be described later. Thus the speed responsive pressure is connected to each of the shift valves 29, 30, 31 to urge them in upshifting direction in response to increasing vehicle speed.

TV 27 is operative to produce a throttle modulator pressure in conduit 384. The vacuum can 70 is connected to the intake manifold vacuum of the engine and through the rod 71 operates on the valve spool 72 in response to the amount of engine vacuum. Thus the vacuum can 70 serves to influence the valve spool 72 in accordance with engine load or throttle position, both of which may vary the intake manifold vacuum.

Governor pressure in conduit 380 is connected through port 77 to the differential area between lands 73 and 74 tending to urge the valve spool 72 to the left. A spring mechanism in the vacuum can 70 initially will tend to urge the valve spool 72 to the right such that land 75 will uncover port 80 having line pressure therein and thus line pressure will be admitted to conduit 384. This pressure is also admitted through port 82 to the differential area between lands 75 and 76 tending to thus move the valve to the left to block port 80. Thus, a regulated pressure which may be referred to as "throttle modulator pressure" will exist in conduit 384. If vehicle speed increases, increased governor pressure in conduit 380 will move valve spool 72 to the left to reduce the pressure in conduit 384. If the engine load greatly increases or if the vehicle accelerator is depressed when the operator is demanding more torque from the engine, engine vacuum will decrease allowing the spring in the vacuum to move valve spool 72 to the right to admit increasing amounts of line pressure into conduit 384. Thus the throttle modulated pressure in conduit 384 increases with engine load or the engine torque demand and decreases with vehicle speed.

The throttle modulator pressure on conduit 384 is connected to RV 26 through port 60 and will affect the valve in a known manner such that high pressure in conduit 384 will actuate RV to increase the line pressure in conduit 56 such that line pressure will also increase with increasing torque demand or load on the engine, and decrease with vehicle speed following the influence of the throttle modulator pressure 384.

RV 26 is also affected by pressure in conduit 364 admitted through port 61 to provide a boosted or increased line pressure in conduit 56 when the MV 25 is in its R position as will be later described.

KDV 28 is operative to supply pressure at times into conduit 390 which pressure is referred to as "kickdown" pressure. Line pressure io communicated through conduit 56 to KDV 28. The spool 85 of KDV 28 is normally moved to the right by spring 98. However, fluid pressure in port 96 will act on the large land 89 and move spool 85 to the full extent of its movement to the left.

KM 40 works in conjunction with KDV 28. When the accelerator of the vehicle is pushed to the extreme limit of its movement in a throttle opening direction, the solenoid 99 of KM 40 is actuated which pulls valve member 100 from its seat 102 thus opening port 101 and conduit 56 to exhaust through port 104. This relieves the pressure in conduit 56 in the section between orifice 361 and KM 40 thereby removing the pressure from port 96 of KDV 28 and allowing spring 98 to move valve spool 85 to the limit of its movement to the right. With the valve spool in its extreme right position conduit 56 is connected through port 93 and the groove between lands 86, 87 into conduit 390. Thus conduit 390 contains a pressure which is hereinafter termed "kickdown pressure," when the accelerator of the vehicle is depressed to its extreme throttle opening position. Pressure in conduit 390 is also connected through port 92 and conduit 392 to port 94 so as to act on the end of spool 85 urging it to the left against the spring 98. Thus the pressure in conduit 390 will be a lower regulated pressure than that in conduit 56 and its value will be affected by the force of spring 98.

MDV 33 is operative to create a pressure in conduit 404 which is termed "accumulator" pressure. MDV 33 is connected to the throttle modulator pressure by the conduit 384. THis pressure acts along with spring 221 tending to move valve spool 210 of MDV 33 to the right. Line pressure exists at port 216 of MDV 33 and as the throttle modulator pressure and the spring moves the spool 210 to the right, line pressure in conduit 56 will be communicated into conduit 404. Line pressure is also communicated through port 217, conduit 406 and port 219 to the land 213 tending to move the spool 210 to the left against the force of the spring 221 and the force created by throttle modulator pressure. Thus a regulated pressure is produced in conduit 404 which will vary in accordance with the size of the spring 221 being utilized and the value of throttle modulator pressure at a given time. It will be seen that high throttle modulator pressure moves the valve spool to a more wide open position tending to increase the value of the accumulator pressure in conduit 404. This increased accumulator pressure is desirable with high throttle modulator pressure which in turn reflects high engine load or torque demand for reasons as will be discussed later.

The MV 25 has 1–2–3–D–N–R–P positions as illustrated in the drawing with N representing neutral position; R representing reverse; P representing park and 1, 2, 3 and D representing forward drive positions of the MV 25. The operation of the present transmission in the various positions of the MV 25 is as follows:

When MV 25 is in the neutral position as illustrated, port 118 thereof is blocked and line pressure is not communicated to any of the friction elements of the transmission and the transmission is in neutral condition.

When selector 110 of MV 25 is moved to the D position, line pressure from conduit 56 will be connected through ports 118, 117 and slot 114 into conduit 358. Line pressure is thus connected though orifice 359 to the forward clutch and also through line 358 and port 334 to the accumulator 43. Thus when the MV 25 is moved to the D position from N position sudden engagement of the forward clutch is prevented since the piston 325 of accumulator 43 will be moved downwardly against the spring 341 producing a time delay for engagement of the forward clutch, and softening the engagement thereof. The gear set with which the present control system is adapted to operate is of the type where, when the forward clutch is engaged, the transmission is automatically conditioned for first speed ratio since a one-way brake acts to hold an element of the planetary gear set once the gear set is connected to the engine through the forward clutch 11, as for example, the gear set mentioned in the pending application Ser. No. 683,414 filed Nov. 15, 1967.

Thus the vehicle has been conditioned for first speed ratio and the operator can move the vehicle forward by releasing the vehicle brake and opening the engine throttle.

Port 119 of MV 25 is also pressurized by conduit 358 at this time. Port 119, which is on the same side of MV 25 as port 117 but on the opposite side of the pressure supply port 118, serves as the main supply port for all forward positions of MV 25 when MV 25 is moved from the D position as will be clear from the following description. Due to this unique arrangement of the signal port 119 being at a different location than port 117 a much shorter and compact MV 25 has been made possible.

The vehicle will remain in first speed ratio until 1-2 SV 29 moves to its upshifted position or upper position, as illustrated in the drawing. Governor pressure is admitted through port 135 and acts on the end of the spool 125 tending to move the spool to its upper or second speed position to establish second speed ratio. Resisting the movement of the valve spool is the spring 147 and the pressure in conduit 410 acting on the differential area between lands 129 and 127 of the valve spool. Pressure in conduit 410 is termed "shift valve plug pressure." Throttle modulator pressure in conduit 384 is admitted through port 173 of 2-3 SV 30 and acts on the differential area between lands 158 and 159 to move valve spool 151 downwardly and admit pressure through port 172 into conduit 410. This movement is resisted by the spring 175, and a regulated pressure termed "shift valve plug pressure" is developed in conduit 410 depending upon the value of the spring and the value of the throttle modulator pressure at any particular time. Thus the valve spool 125 is influenced by the throttle modulator pressure and tending to keep it in its downshifted position and governor pressure tending to move it to its upshifted position. When the vehicle speed increases to the extent that the governor pressure in conduit 382 is great enough to overcome the force of the spring and the force of "shift valve plug pressure," valve spool 125 will move to its upper or second speed position.

In the construction illustrated, branch conduit 450 is open to governor pressure conduit 382. Thus governor pressure is imposed on the differential area between lands 133-134 and reduces the force produced by governor pressure on the end of land 134 on spool 126. By having the optional connection through conduit 450 the response of 1-2 SV 29 can be varied to suit the particular first drive ratio which is to be used in the transmission. If conduit 450 is used the total governor pressure effect on spool 126 is reduced and the transmission will remain longer in first drive ratio as is desirable to obtain the proper 1-2 shift with a lower first drive ratio.

In the second speed position of 1-2 SV 29 line pressure at port 140 is admitted through the groove between lands 130 and 132 and port 139 into conduit 412. The pressure in conduit 412, since the spool 150 of 2-3 SV 30 is in its downshifted or second speed position, will be admitted through the groove between lands 155 and 156 and port 168 into conduit 416 and thus to the second speed brake 13. Pressure in conduit 416 is also admitted through port 320 to act on the surface 315 of the piston 313 of accumulator 41. Thus a sudden engagement of the second gear brake is prevented since the accumulator piston will move against the force of the spring 317 to make a smooth engagement of the second gear brake.

The area of the accumulator piston 313 on the opposite side from surface 315 has the accumulator pressure in conduit 404 imposed thereon. If the pressure in conduit 404 is high, it will tend to resist movement of the piston 313 with a greater force and raise the pressure supplied to brake 13 during its engagement period. This function is desirable since the accumulator pressure in conduit 404 increases as explained above with increasing engine load or torque demand. At a time when the throttle is heavily depressed the accumulator pressure will be high giving a firm engagement of the second gear brake which is desirable at this time. The operation of the accumulator 42 when the vehicle is conditioned for third gear is similar to that of the accumulator 41 and will not be further described. Likewise, it provides a firm engagement of the third gear brake if the accumulator pressure is high and a soft engagement if the accumulator pressure in conduit 404 is low.

The vehicle will remain in second speed ratio until valve spool 150 of the 2-3 shift valve 30 moves to its third speed or upshifted or upper position as shown in the drawing. As in the case of the 1-2 SV 29, governor pressure acts on the land 152 tending to move valve spool 150 to its upshifted position. Movement of the valve spool is resisted by the force of spring 175, the force of spring 175 being affected by the effect of throttle modulator pressure acting on differential area of the lands 158 and 159 on valve spool 151, and is also resisted by the shift valve plug pressure at port 170 acting on the end of the valve spool 150. When the governor pressure is high enough it will move valve spool 150 to its upshifted or upper position as illustrated in the drawing. In the upper position of valve spool 150, line pressure at port 165 is connected through the groove between lands 153, 154 and port 164 to conduit 422. Pressure in conduit 422 is transmitted through 4-3 DTV and through port 194 of 3-4 SV 31, the groove between lands 184 and 185 and port 195 to conduit 424 connected to the third gear brake to engage the third gear brake and condition the transmission for third speed ratio. This connection is made since the valve spool 180 at this time will be in its downshifted or lower position. Means are provided to produce sufficient overlap, to retard release of the second gear brake such that the second gear brake will be released during the apply of the third gear brake being engaged so that the engine speed will be reduced during engagement of the third gear brake, The EV 37 comes into operation to complete the exhaust of the second gear brake.

To disengage the second gear brake the port 168 of 2-3 SV 30 is connected to port 169 through groove between lands 155 and 156 when valve spool 150 moves to its upshifted position thus connecting conduit 416 and the second gear brake to conduit 418. Pressure in conduit 418 can thus flow through port 276 of EV 37, the groove between lands 271 and 272, and port 277 to exhaust. EV 37 is initially in its right-hand position as moved by spring 280 and accumulator pressure at port 275. The conduit 418 is thus blocked by EV 37 and the pressure therein can exhaust only through orifice 419 whereby the release of brake 13 is retarded to produce the overlap condition. However, spool 270 of EV 37 is moved to the left by the line pressure in conduit 424 when it reaches a predetermined value after the 2–3 SV 30 makes the upshift to the third gear brake. Line pressure will act on the valve spool 270 to move it to the left only after the pressure being transmitted to the third gear brake reaches a predetermined value. This will then completely exhaust second gear brake 13 by opening port 276 to port 277.

The vehicle transmission will remain in the third speed condition until valve spool 180 of 3–4 SV 31 moves to its upshifted position. Governor pressure in conduit 382 tends to move the valve to its upshifted position and is resisted by the force of springs 207 and 208 and by the throttle modulator pressure being admitted through conduit 384 and acting on the end of valve spool 181 urging same into engagement with valve spool 180. Further, the throttle modulator pressure in port 203, when valve spool 181 moves downwardly, is admitted into port 202 and through conduit 427 to port 200 whereby a regulated or second shift valve plug pressure is created in conduit 427 which acts on the end of valve spool 180 also tending to resist movement of valve spool 180 to its upshifted position. When the governor pressure is high enough the valve spool 180 will be moved to its upshifted position. Line pressure is thus admitted from conduit 422 through port 199 through the groove between lands 185, 186, and port 198 into conduit 440 and thereby to the clutch 12 to engage same and condition the vehicle for 4th speed or direct drive operation since both clutches are engaged. Conduit 440 is connected through port 337 to accumulator 43 whereby the pressure in conduit 440 acts on the surface 330 of piston 325 tending to move same in an upward direction such that accumulator 43 is also active to soften the engagement of the fourth gear clutch to provide a smooth shift. The resistance of piston 325 of the accumulator 43 to movement by the pressure in conduit 440 is varied in accordance with the line pressure in conduit 358 such that greater line pressures, as would exist when the throttle modulator pressure is high, will make the engagement of the 4th gear clutch 12 more firm.

Similar to the action of EV 37 on the 2–3 upshift, EV 38 is active on the 3–4 upshift to time the release of the third gear brake so as to provide a smooth upshift providing an overlap condition such that the third gear brake will not completely be released before the clutch 12 is engaged. When 3–4 SV of valve spool 180 moves to its upshifted position, conduit 424 is connected from port 195 through the groove between lands 184, 185, port 196 to conduit 442 and thus to port 291 of EV 38. Similar to the operation of EV 37, EV 38 is initially positioned to the right by spring 296 such that exhaust or release of the third gear brake is not possible except through orifice 443. However, when line pressure builds up to a predetermined value in conduit 440, to engage clutch 12, this pressure being connected at port 294 of EV 38, valve spool 285 will be moved to the left to completely exhaust brake 14 through ports 291 and 292.

It should be noted that EV 37 and EV 38 respond to accumulator pressure in conduit 404 and will be moved to their exhaust position sooner than otherwise when accumulator pressure is high. This function is desirable since with higher engine torque demands, the overlap period can be much shorter. Further, the accumulators 41 and 42 function such that during the time either brake 13 or 14 is blocked by its associated EV the accumulator pistons move down due to spring force and accumulator pressure, to act as fluid pumps to maintain a certain pressure in the brake supply conduits to keep the brakes engaged until the accumulator pistons reach the lower end of their stroke.

The transmission, by movement of the 3–4 SV 31 to its upshifted position, is thus in 1:1 forward fourth speed ratio and will remain so until the vehicle speed drops such that the 3–4 SV 31 will again to moved to its downshifted position to establish third speed ratio. This may occur due to decrease in vehicle speed or due to increased throttle modulator pressure in conduit 384. The shift valves are interrelated, as will be described, such that the shift valves downshift in the reverse order of the upshifts in that 3–4 SV 31 will downshift first, 2–3 SV 30 next, and 1—2 SV 29 last. However, on closed throttle downshifts the sequence of downshifting is 4–3–1 since the land sizes are such that the 1–2 SV 29 downshifts before 2–3 SV 30 downshifts when the modulator pressure is zero as is the case, when the throttle is closed.

Downshifts may also be produced by using the kickdown operation of the transmission. As explained above, when the vehicle throttle is depressed to the limit of its movement in an opening direction it will actuate KM 40 to actuate KDV 28 to produce kickdown pressure in conduit 390. Kickdown pressure in conduit 390 is admitted at port 201 of 3–4 SV 31 and will produce sufficient force on the valve to move it to the third speed position. When the 4–3 downshift takes place, the fourth gear clutch 12 must be released and the third gear brake 14 engaged to produce the downshift when 3–4 SV 31 moves to its downshifted position. The pressure in conduit 440 is exhausted through port 198, the groove between lands 186 and 185, port 197 and conduit 365 and 352 to exhaust through the MV 25.

Movement of the valve spool 180 to the downshifted or third speed position will again open conduit 422 through port 194 and port 195 to conduit 424 to engage the third gear brake. Since the pressure in this conduit has been exhausted fluid must flow from conduit 422 into conduit 424. At this time, the 4–3 DTV 36 becomes active to vary the speed of engagement of the third gear brake in dependence upon vehicle speed. If the valve spool 239a of DTV 36 is in its upper position, the fluid flowing through conduit 422 to engage the third gear brake must flow through the orifice 423 as well as the orifice 426 since land 256a will block port 257a. The valve will be held in its upper position if the governor pressure admitted at port 258a acting on the differential area between lands 243a and 242a is high enough to overcome springs 250 and 251a. This means that at a higher vehicle speed the valve will be in its upper position creating a slower engagement of the third gear brake so that the downshift is delayed at higher vehicle speeds. This function is necessary because at higher vehicle speeds an uncomfortable downshift is created if the shift is sudden. If the governor pressure is below a predetermined value such that of the springs 250a and 251a can overcome the force of the governor pressure, spool 239a will be held in its lower position which creates a bypass around orifice 423 allowing fluid to flow between ports 257a and 256a into conduit 422 to allow faster flow of fluid into conduit 424. The bypass then is operative to increase the speed of engagement of third gear brake at the lower vehicle speeds when a more rapid 4–3 downshift is permissable.

It should be noted that spring 251a and the spool 240a will hold spool 239a in its down or bypass position during the 3–4 upshift. DTV 36 is conditioned for operation only after 3–4 SV 31 moves to its upshifted position and pressure builds up in port 260a of DTV 36 and acting on differential area of lands 244a and 245a overcomes spring 251a and moves spool 240a to its upper position.

The next downshift is the 3–2 downshift which occurs when the valve spool 150 of the 2–3 SV 30 moves to its second speed or downshifted position. Similar to the 3–4 SV this will depend upon the vehicle speed and the value of the pressure in throttle modulator conduit 384 and accordingly the shift valve plug pressure in conduit 410. When the valve spool 150 moves to its downshifted position the connection of line pressure from conduit 358 between ports 165 and 164 is interrupted thereby interrupting the flow of pressure into conduit 422 which supplies the third gear brake. DTV 35 becomes active at this time to time the 3–2 downshift. When valve spool 150 moves to its downshifted position conduit 412 is again connected to conduit 416 through ports 167 and 168 to engage the second gear brake. The fluid to be supplied to conduit 416 engages the second gear brake, however, it must flow into conduit 412 through orifice 443 or bypass same in dependence on the position of valve spool 239 of DTV 35. If governor pressure is sufficiently high it will act on the differential area between lands 243 and 242 to move valve spool 239 to its upper position in which land 256 blocks the bypass through ports 256 and 257 to conduit 412. This delays the downshift at higher vehicle speeds which is necessary to provide for a smooth downshift. If the vehicle speed and corresponding governor pressure is low enough, the springs 251 and 250 will be operative to move valve spool 239 to its lower position opening the bypass around orifice 443. Thus the DTV 35 is operative to time the engagement of the second gear brake on a 3–2 downshift.

Similar to DTV 36, DTV 35 is in its non-operative or bypass position during the 2–3 upshift. DTV 35 is conditioned for operation only after 2–3 SV 30 moves to its upshifted position and pressure builds up at port 260 to move spool 240 up.

A 2–1 downshift can then be obtained as the vehicle speed continues to decrease reducing the governor pressure at port 135 acting on valve spool 125 of 1–2 SV 29. Since a one-way brake is used in transmission of this type to obtain automatic first speed position, the inherent quality of the one-way brake to engage at the proper time depending on relative shift speeds eliminates the need for a 2–1 downshift timing valve.

3 POSITION OF MV 25

The 3 position of MV 25 may be selected by moving directly from the N position or it may be selected from the D position of MV 25. If the MV 25 has been in D position and the transmission is operating in fourth speed an immediate downshift to third speed will be provided. When MV 25 is moved to third speed or 3 position line pressure in conduit 56 will be admitted into conduit 358 in a manner similar to that described above with respect to position D. However, in the 3 position the spool 110 also connects line pressure in port 119 through the slots 113 and 111 into port 122 and thereby into conduit 356. Line pressure is also connected through port 119, slots 113 and 111 and port 120 into conduit 350. Thus conduits 356 and 350 are supplied with line pressure in the 3 position of the MV 25. Line pressure in conduit 350 will flow through port 308 of BSV 39 and through ports 305 and 306 into conduit 382 replacing governor pressure in this conduit. The effect then is to produce full line pressure in the governor pressure ports of each of the shift valves. Thus the 1–2 and 2–3 shift valves will be immediately urged to their upshifted positions if they are not in these positions previously. Line pressure in conduit 356 is admitted to the port 205 of 3–4 SV 31 which acts on the large land 205 and which produces sufficient force as aided by spring 208 to move the valve spool 180 of 3–4 SV 31 to its downshifted position regardless of the pressure in the conduit 382. Thus the valve spool 180 will be moved immediately to its downshifted position and will thus establish third speed drive ratio whereas the 1–2 and 2–3 SVs 29 and 30, respectively are held in their upshifted positions such that line pressure will be admitted through these valves in a manner described above under automatic operation such that line pressure is supplied to conduit 424 to engage the third gear brake. Thus when the 3 position is selected an immediate shift to third speed will be established regardless of the previous positions of the shift valves in the transmission since line pressure is admitted at various points to move the shift valves to the positions described. With this type of control circuit as illustrated in the drawing, third speed ratio when 3 is selected will be established and will be retained. In other words, upshift or downshift is not available in this position of MV 25 because of the line pressure holding 1–2 SV 29 and 2–3 SV 30 in upshifted position and 3–4 SV 31 in downshifted position.

However, in certain applications it is desirable to have an automatic control circuit such that if the operator selects 3 after the vehicle is in fourth position an immediate downshift to 3 would be obtained, but downshifts to second or first ratio and upshifts from first, second to third would be available, the valves functioning in a similar manner to that described above with regard to first, second and third speed ratios. To obtain this type of function conduit 350 is blocked or eliminated. This would also make unnecessary the use of BSV 39. If conduit 350 is eliminated, no line pressure would be admitted at this time into the governor pressure conduit 382 so that 1–2 SV 29 and 2–3 SV 35 would receive governor pressure and function automatically, as described above. However, since conduit 356 would be retained, the line pressure would be operative to immediately downshift 3–4 SV 31 and prevent engagement under any condition of the 4th speed drive ratio. Line pressure in conduit 356 also is admitted in port 265 of DTV 36 thus urging the valve spool 240a and 239a of DTV downwardly with line pressure to overcome the effect of governor pressure at port 258a. Thus the bypass position of DTV 36 is produced such that rapid engagement of third gear brake will be established since delayed engagement is not desired when 3 position of the manual valve is selected.

2 POSITION OF MV 25

When 2 position of MV 25 is selected, conduits 356 and 358 continue to receive line pressure. Conduit 350 is exhausted and line pressure is admitted to additional conduit 352 through port 121 since slot 111 now communicates with port 121. Additional conduit 375 is also supplied with pressure since ports 119 and 124 communicate through slot 112. As described above the effect is such that due to line pressure in conduit 356 3–4 SV 31 is immediately moved to its downshifted position. Line pressure in conduit 352 will also be admitted through port 232 into port 231 of 3–2 IV 34 and thus through orifice 399 to port 233 of IV 34. The spring 236 at this time positions valve spool 225 of IV 34 to the right opening communication between ports 232 and 231. Thus pressure will be admitted from port 231 and also into conduit 396. When MV 25 is moved to the 2 position, IV 34 serves to admit pressure to conduit 396 which will act to move 2–3 SV 30 to the second speed position. Since the pressure in conduit 396 acts on differential area between lands 227 and 228 to move the valve to the left and block the connection between ports 232 and 231 a regulated pressure will be produced in conduit 396. The 2–3 SV 30 has governor pressure at port 161 imposed on a large land 152 such that, depending on the vehicle speed, if the vehicle is operating in third speed ratio when the shift is made to 2, the governor pressure may be high enough to overcome the effect of the pressure at port 174 and prevent downshift to second speed until the vehicle speed drops to a desirable value. Pressure admitted at port 137 through conduit 375 will act on spool 125 to hold it in its upper position so that the transmission will remain in second ratio thereafter with MV 25 in 2 position. Referring to 2–3 SV 30, after spool 150 moves to the downshifted position line pressure in conduit 352 will be admitted to port 162 and act on the differential area between lands 152 and 153 to prevent any subsequent upshift to third speed once the 2–3 SV is moved to its second speed position.

1 POSITION OF MV 25

In the 1 position of MV 25 the same fluid connections are made as in the 2 position with the exception that pressure is not admitted to conduit 375 since slot 112 no longer communicates ports 124 and 119 but connects port 124 to exhaust port 123. Thus 2–3 SV 30 and 3–4 SV 31 are held in their downshifted positions as in 2 position of MV 25 as explained above. Pressure is no longer supplied to port 137 and downshift movement of spool 125 is thus available by spring 147 when the governor pressure is low enough. Thus the shift to first ratio is inhibited if the vehicle speed is too high. Once spool 125 moves to its downshifted position, pressure in conduit 352 at port 148 will act on the end of spool 125 to hold the same and maintain the transmission in first ratio as long as MV 25 remains in the 1 position. Pressure in port 148 will flow through port 149 to conduit 365 to engage reverse brake 15. In accordance with operation of the transmission, disclosed in the above-mentioned application, engagement of clutch 11 and reverse brake 15 places the transmission in first ratio with a two-way drive since in 1 position engine braking is desired and is not available in 1 obtained through the medium of a one-way brake.

It should also be noted that in the 1 position of MV 25, port 119 communicates with port 118 through slot 114 and conduit 358 is now pressurized through port 119.

R POSITION OF MV 25

In the R position of MV 25 line pressure flows from port 118 through slots 113 and 111, and port 116 to conduit 364. No other conduits are pressurized by MV 25 in R position. Since conduit 358 is not pressurized, the forward clutch 11 is not applied. Pressure is also admitted through ports 145, 146 and 147 of 1–2 SV 29 into conduit 365 to engage the reverse brake 15. Pressure in conduit 365 flows through ports 197 and 198 of 3–4 SV 31 to engage clutch 12. None of the other friction elements except for clutch 12 and brake 15 can be engaged since the key pressure line conduit 358 for these elements is not pressurized.

From the above it will be apparent that the control system of the present invention provides a novel and improved control mechanism for automatic transmissions of the four speed type. The control system provides, through the medium of EVs 37 and 38, control of the upshifts from second to third speed and third to fourth speed to ensure that the release of one friction element and the engagement of another friction element occur at the proper time to prevent jerking or lurching of the vehicle. Further, the engagement of the particular friction elements is regulated and controlled by accumulator structures, the accumulator structure having a variable response in dependence upon a pressure reflecting the engine load or torque demand and vehicle speed such that it is slightly delayed to provide an extremely smooth shift. Further the improved control structure includes the timing valves 35 and 36 which operate on downshifts of the transmission from the fourth to third ratio and from second to third ratio to time the engagement of the friction element being applied for the downshift such that the friction element will be engaged slowly or rapidly by controlling a bypass around an orifice in response to vehicle speed. Thus the downshifts also are made smooth by controlling the rate of engagement of the friction elements. Further, the use of particular fluid connections provides a convenient unit in which, using manual selector positions of D–3–2–1 D produces automatic shifting between first, second, third and fourth ratios; in the 3 position either automatic shifting between first, second or third can be provided or third ratio only, depending upon whether or not line 350 is included in the control circuit; and in the 2 and 1 position manual selection of first or second ratio is provided. Also a manual selector valve has been used which is of an improved construction allowing the valve to be extremely compact and short in length for the number of positions desired.

Further, by use of an accumulator 43 which is operative for engagement of both the forward clutch 11 and the clutch 12, one accumulator serves the purpose of controlling engagement of two friction elements such that an accumulator is operative on the engagement of each of four friction devices for each of the four speed ratios and only three accumulators are required.

Various features of the invention have been particularly shown and described; however, it should be obvious to one skilled in the art that modifications may be made therein without departing from the scope of the invention.

I claim:

1. A hydraulic control system for an automatic transmission including a source of fluid pressure, a plurality of fluid pressure-operated engaging means for establishing various drive ratios through the transmission, a plurality of shift valves movable to establish a connection between said source and said engaging devices to establish the drive ratios, an exhaust valve connected to one of said engaging devices, said exhaust valve having a first condition providing a substantially unrestricted flow path to exhaust pressure from said engaging device and a second condition blocking said flow path, urging means connected to said exhaust valve and tending to place said exhaust valve in said first condition, means to develop a modulating signal responsive to engine torque demand and vehicle speed, said modulating signal being connected to said exhaust valve and tending to retain said exhaust valve in said second condition, separate means connected to said one engaging device providing a restricted exhaust flow path for said one engaging device when exhaust valve is in said second condition, said urging means for said exhaust valve including means responding to engaging pressure for an additional engaging device, said responding means being operative to place said exhaust valve in its first condition when said engaging pressure reaches a predetermined value whereby when said drive ratio is changed by engaging said additional engaging device and disengaging said one engaging device, disengagement of said one engaging device will be retarded for a time dependent upon said modulating signal and the value of said engaging pressure to provide for smooth ratio changing.

2. A device as claimed in claim 1 wherein a plurality of said exhaust valves are provided whereby for at least two of the ratio changes of the transmission the rate of exhaust of pressure from said one engaging device is controlled.

3. A control system as claimed in claim 1 including an accumulator device acting as a source of pressure to maintain said one engaging device engaged when the engaging pressure for said one engaging device is being exhausted through said separate means.

4. A control system as claimed in claim 3 wherein said accumulator device is responsive to said modulator signal whereby the time period for which said accumulator acts as a pressure source will vary with said modulator signal.

5. A hydraulic control system for an automatic transmission including a source of fluid pressure and a plurality of fluid pressure-operated engaging devices for establishing various drive ratios through the transmission, a plurality of shift valves movable to establish a connection between said source and said engaging devices to establish the drive ratios, an exhaust valve connected to one of said engaging devices, said exhaust valve including means movable between a first position providing a substantially unrestricted flow path to exhaust pressure from said engaging device and a second position blocking said flow path, urging means urging said movable means toward said first position, means to develop a modulating pressure responsive to engine torque demand, said modulating pressure being connected to said exhaust valve to produce a force on said movable means tending to retain said movable means in said second position, means connected to said one engaging device to provide a restricted exhaust flow path for said one engaging device when said movable means is in said second position, said urging means for said exhaust valve including a connection to engaging pressure for an additional engaging device, said engaging pressure being operative to urge said movable means to its first position when said engaging pressure reaches a predetermined value whereby when said drive ratio is changed by engaging said additional engaging device and disengaging said one engaging device, disengagement of said one engaging device will be retarded for a time dependent upon said modulating pressure and the value of said engaging pressure to provide for smooth ratio changing.

6. A control system as claimed in claim 5 including resilient means also urging said exhaust valve to said second position.

7. A device as claimed in claim 5 wherein a plurality of said exhaust valves are provided whereby for at least two of the ratio changes of the transmission the rate of exhaust of pressure from said one engaging device is controlled.

8. A control system as claimed in claim 5 including an accumulator device acting as a source of pressure to maintain said one engaging device engaged when the engaging pressure for said one engaging device is being exhausted through said means connected to said one engaging device.

9. A control system as claimed in claim 8 wherein said accumulator device is connected to said modulator pressure whereby the time period for which said accumulator acts as a pressure source will vary with said modulator pressure.

10. A hydraulic control system for an automatic transmission including a source of fluid pressure and a plurality of fluid pressure-operated engaging devices for establishing various drive ratios through the transmission, a plurality of shift valves movable to establish a connection between said source and said engaging devices to establish the drive ratios, an exhaust valve connected to one of said engaging devices, said exhaust valve including means movable between a first position providing a substantially unrestricted flow path to exhaust pressure from said engaging device and a second position blocking said flow path, urging means urging said movable means toward said first position, means developing a modulating pressure responsive to engine torque demand, said modulating pressure being connected to said exhaust valve to produce a force on said movable means tending to retain said movable means in said second position, separate means connected to said one engaging device providing a restricted exhaust flow path for said one engaging device when said movable means in in said second position, said urging means for said exhaust valve including a connection to engaging pressure for an additional engaging device, said engaging pressure being operative to urge said exhaust valve to its first position when said engaging pressure reaches a predetermined value, an accumulator device acting as a source of pressure to maintain said one engaging device engaged when the engaging pressure for said one engaging device is being exhausted through said separate means, whereby when said drive ratio is changed by engaging said additional engaging device and disengaging said one engaging device, disengagement of said one engaging device will be retarded for a time dependent upon said modulating pressure and the value of said engaging pressure to provide for smooth ratio changing.

11. A device as claimed in claim 10 wherein a plurality of said exhaust valves are provided whereby for at least two of the ratio changes of the transmission the rate of exhaust of pressure from said one engaging device is controlled.

12. A control system as claimed in claim 10 wherein said accumulator device is connected to said modulator pressure whereby the time period for which said accumulator acts as a pressure source will vary with said modulator pressure.

13. A control system as claimed in claim 10 including means modifying said modulating pressure in response to vehicle speed.

14. In a hydraulic control system for an automatic transmission having a shift valve having at least two positions and being operable to change the ratio of the transmission as said valve is moved between said positions, a source of fluid pressure, governor means connected to said source and to said shift valve, said governor means producing a governor pressure responsive to vehicle speed and having a first connection with said shift valve, said governor pressure increasing with vehicle speed and urging said shift valve to one of its positions to change the ratio through the transmission, means connected to said shift valve and resisting movement thereof to said one position, a second connection between said governor pressure and said shift valve, said shift valve having lands thereon of differential area, said lands being exposed to governor pressure through said second connection and urging said valve in an opposite direction to said governor pressure in said first connection whereby the total effective force of said governor pressure on said shift valve is reduced and optional means in said second connection whereby said connection can be completed or interrupted so that response of said shift valve to governor pressure may be varied depending upon whether said second connection is completed or interrupted.

15. A hydraulic control system as claimed in claim 14, wherein said optional means comprises a plate provided intercepting said second connection which may optionally be provided with a hold therethrough in the area of said second connection to open said connection.

16. A hydraulic control system for an automatic transmission including a plurality of engaging devices each actuable to establish a particular drive ratio, at least two shift valves each connected to at least one of said engaging devices and each having an upshifted and a downshifted position and in each position conditioning the transmission for a particular drive ratio by making fluid connections to engage one of said engaging devices and exhaust another of said engaging devices, a pair of exhaust valves one for each of said shift valves and operable to vary the rate at which fluid pressure is exhausted from said another engaging device as said shift valve moves to its upshifted position, a pair of timing valves one for each of said shift valves operable to vary the rate of supply of pressure to said one engaging device when said shift valve moves to its downshifted position, whereby each change of ratio made by said shift valves as they move to their downshifted positions is controlled by a separate timing valve and each change of ratio made by said shift valves as they move to their upshifted positions is controlled by an exhaust valve so that the ratio changes made in either the upshifting or downshifting direction by each shift valve can be controlled by changing the structure of a single timing or exhaust valve without effecting the character of the other ratio changes made in the transmission.

17. A hydraulic control system as claimed in claim 16 wherein each of said exhaust valves is connected to one of said engaging devices, said exhaust valves having a first condition providing a substantially unrestricted flow path to exhaust pressure from said engaging device and a second condition blocking said flow path.

18. A hydraulic control system as claimed in claim 17 including means to develop a modulating pressure responsive to engine torque demand, said modulating pressure being connected to said exhaust valves to urge said exhaust valves to maintain said second condition.

19. A hydraulic control system as claimed in claim 17 including separate means connected to said one engaging device and providing a restricted exhaust flow path for said one engaging device when said exhaust valve is in said second condition.

20. A hydraulic control system as claimed in claim 18 including a connection to engaging pressure for an additional engaging device, said engaging pressure being operative to place said exhaust valve in its first condition when said engaging pressure reaches a predetermined value whereby when said drive ratio is changed by engaging said additional engaging device and disengaging said one engaging device, disengagement of said one engaging device will be retarded for a time dependent upon said modulating pressure and the value of said engaging pressure to provide for smooth ratio changing.

21. A hydraulic control system as claimed in claim 16 wherein said timing valves have a first condition providing a substantially unrestricted flow path for fluid pressure being supplied to said one engaging device and a second condition providing a restricted flow path for pressure being supplied to said one engaging device.

22. A hydraulic control system as claimed in claim 21 including means providing a governor pressure varying with vehicle speed and means connecting said governor pressure to said timing valve and urging said timing valve to its second condition.

23. A hydraulic control system as claimed in claim 20 including means providing a governor pressure varying with vehicle speed and means providing a modulator pressure varying with engine torque demand, means connecting said governor pressure to said timing valves whereby the condition of said timing valves varies in accordance with the vehicle speed and means connecting said exhaust valves to said modulator pressure whereby the condition of said exhaust valves varies in accordance with engine torque demand.

* * * * *